United States Patent
Hoshi et al.

(10) Patent No.: US 6,456,065 B2
(45) Date of Patent: Sep. 24, 2002

(54) DEVICE FOR DETECTING THE ROTATIONAL ANGLE OF A ROTARY MEMBER

(75) Inventors: Toshiyuki Hoshi; Hironori Kato; Yoshio Sanpei; Hirofumi Okumura; Ichirou Tokunaga; Toshio Ogawa, all of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/731,508

(22) Filed: Dec. 7, 2000

(30) Foreign Application Priority Data

Dec. 17, 1999 (JP) ............................. 11-359477

(51) Int. Cl.$^7$ ......................... G01B 7/30; G01B 21/22; G01D 5/12
(52) U.S. Cl. ............................. 324/207.25; 324/207.2; 702/1.51
(58) Field of Search ................. 324/207.2–207.25, 324/165, 173, 174; 250/231.16, 231.17; 702/145, 147, 148, 150, 151; 340/672; 701/41

(56) References Cited

U.S. PATENT DOCUMENTS

| | | | |
|---|---|---|---|
| 4,720,791 A | | 1/1988 | Daido |
| 4,829,247 A | * | 5/1989 | Wallrafen ........... 324/207.25 X |
| 4,966,041 A | * | 10/1990 | Miyazaki .................. 324/207.2 |
| 5,218,279 A | * | 6/1993 | Takahashi et al. ........... 324/174 |
| 5,241,173 A | * | 8/1993 | Howley et al. ..... 324/207.22 X |
| 5,463,393 A | | 10/1995 | Havlicsek |
| 5,486,759 A | * | 1/1996 | Seiler et al. ......... 324/207.2 X |
| 5,532,583 A | * | 7/1996 | Davis et al. ......... 324/207.2 X |
| 5,656,936 A | | 8/1997 | Ao et al. ................ 324/207.21 |
| 6,087,829 A | * | 7/2000 | Jager .................... 324/207.2 X |
| 6,246,232 B1 | * | 6/2001 | Okumura ................. 324/207.2 |

FOREIGN PATENT DOCUMENTS

| | | |
|---|---|---|
| DE | 42 20 883 A1 | 1/1994 |
| DE | 197 12 869 A1 | 10/1998 |

* cited by examiner

Primary Examiner—Gerard R. Strecker
(74) Attorney, Agent, or Firm—Brinks Hofer Gilson & Lione

(57) ABSTRACT

A rotational angle detecting device includes a rotation detecting section for outputting sinusoidal first and second detection signals as a result of the rotation of a rotor connected to a rotary member, a storage section for updating and storing the first and second detection signals, and a controlling section. The first and second detection signals have constant amplitudes, have the same periods, and have wavelengths which are output of phase. The controlling section compares the amplitude values of most recent first and second detection signals output from the rotation detecting section, and determines whether or not the amplitude values fall within proper ranges. When the controlling section determines that they fall within the proper ranges, a piece of detection information which is created based on the most recent first and second detection signals is supplied to a controller. On the other hand, when the controlling section determines that they do not fall within the proper ranges, the controlling section destroys the most recent first and second detection signals, and does not supply detection information to the controller. The invention provides a rotational angle detecting device for performing required controlling operations using detection signals output from the rotational detecting section which have been determined as being proper detection signals.

4 Claims, 6 Drawing Sheets

US 6,456,065 B2

DEVICE FOR DETECTING THE ROTATIONAL ANGLE OF A ROTARY MEMBER

BACKGROUND OF THE INVENTION

1. Field of the Invention

The present invention relates to a rotational angle detecting device, and, more particularly, to a rotational angle detecting device which is connected to a rotary member, such as a steering shaft of an automobile, and which outputs two or more detection signals which are in correspondence with the rotational angle and the rotational direction of the steering wheel in order to detect the rotational angle of the rotary member using these detection signals.

2. Description of the Related Art

Hitherto, a rotary sensor has been used to form a rotation detecting section. As an example of such a rotary sensor, the following rotary sensor will be described. (This rotary sensor will hereinafter be referred to as "conventional rotary sensor.")

The conventional rotary sensor comprises a fixed base member, a rotor which can rotate with respect to the base member, and a rotation detecting section disposed between the base member and the rotor. The rotation detecting section outputs a sinusoidal first detection signal, a sinusoidal second detection signal, and a third detection signal. The first and second detection signals have constant amplitudes and the same periods, and are out of phase by ¼ wavelength. The third detection signal has the same period in the entire rotational range of the rotor and increases linearly. When the rotary sensor is used, the rotor is connected to a rotary member such as a steering shaft of an automobile. Here, the rotation detecting section comprises first and second magnets, and first to third Hall elements. The first and second magnets are disposed at the base member. The first and second Hall elements are disposed at the rotor so as to oppose the first magnet at an angle of substantially 90 degrees. The third Hall element is disposed so as to oppose the second magnet.

In this structure, when the steering wheel is rotated in order to rotate the steering shaft connected to the steering wheel, the rotor connected to the steering shaft rotates, causing the rotation detecting section to generate the first to third detection signals which are in correspondence with the rotational angle and the rotational direction of the steering shaft.

The generated first to third detection signals are supplied to a controlling section installed in the automobile. Based on the supplied third detection signal, the controlling section detects the rotational direction and the rough rotational angle from the neutral position of the steering wheel (or the steering shaft). Similarly, based on the supplied first and second detection signals, the controlling section detects the very small rotational angle from the neutral position of the steering wheel (or the steering shaft). The detected rotational direction and rotational angles from the neutral position of the steering wheel (or the steering shaft) are supplied to a controller as detection information. Based on the supplied detection information, the controller carefully controls the traction and the suspension of the automobile.

FIG. 7 is a graph showing the relationship between the angle of rotation of the steering wheel and the output voltage of each of the first, second, and third detection signals.

In FIG. 7., reference numeral 71 denotes the first detection signal, reference numeral 72 denotes the second detection signal, and reference numeral 73 denotes the third detection signal. FIG. 7 shows the variations in the output voltages of the first to third detection signals 71 to 73 with respect to a rotational angle of zero degrees (that is, the neutral position) of the steering wheel, within a rotational angle range of from 0° to +225°.

Here, the first detection signal 71 and the second detection signal 72 are sinusoidal, have the same amplitudes and periods, and are out of phase by ¼ wavelength. For both of these signals 71 and 72, the voltages are 4.5 V at maximum amplitude, and 0.5 V at minimum amplitude. For the first detection signal 71, when the rotational angles are +67.5° and +157.5°, the amplitude thereof is a minimum (voltage= 0.5 V). For the second detection signal 72, when the rotational angles are 0°, +90.0°, and +180.0°, the amplitude thereof is a minimum (voltage=0.5 V). The third detection signal increases linearly from a rotational angle of 0° to +225°, and has a voltage of 2.5 V when the rotational angle is 0° and a voltage of 3.0 V when the rotational angle is +180°.

Hereunder, using the graph of FIG. 7, the detection of the rotational direction and rotational angle of the steering wheel carried out at the controlling section will be described.

First, when the controlling section is to detect the rotational direction of the steering wheel from the neutral position (which corresponds to an angle of rotation of 0°) of the steering wheel, it detects the rotational direction by the voltage value of the supplied third detection signal 73 which has been supplied. More specifically, when the voltage value of the third detection signal 73 is more than 2.5 V, the controlling section detects that the rotational direction of the steering wheel corresponds to one direction (that is, the positive rotational angle direction). On the other hand, when the voltage value of the third detection signal 73 is less than 2.5 V, the controlling section detects that the rotational direction of the steering wheel corresponds to the other direction (that is, the negative rotational angle direction).

Then, as shown in FIG. 7, the controlling section divides the entire rotational angle range of the steering wheel, such as a rotational angle range of 1440° (±720°), into angle (such as 90°) divisions which correspond to one wavelength of each of the first detection signal 71 and the second detection signal 72. These divisions are represented as . . . , N−1, N, N−2, . . . Then, based on the voltage value of the supplied third detection signal 73, the controlling section detects a rough rotational angle which indicates to which angle division the rotational angle of the steering wheel corresponds. For example, if the controlling section detects that the voltage value of the third detection signal 73 is 2.8 V, the angle division N is detected as the angle division corresponding to this voltage value.

Thereafter, the controlling section determines a first voltage value $V_1$ and a second voltage value $V_2$ when the voltage values of the supplied first and second detection signals 71 and 72 are the same in the detected angle division N. Using the obtained first and second voltage values $V_1$ and $V_2$, one detection signal which has a voltage value outside the voltage range of the first and second voltage values $V_1$ and $V_2$, and the other detection signal which has a voltage value within the voltage range of the first and second voltage values $V_1$ and $V_2$ are determined.

After the determination, the controlling section determines whether the other detection signal whose voltage value lies within the voltage range of the first and second voltage values $V_1$ and $V_2$ is the first detection signal 71 or the second detection signal 72. At the same time, the controlling section determines whether the one detection signal whose voltage value lies outside the voltage range of the first and second voltage values $V_1$ and $V_2$ has a voltage value which is less than the first voltage value $V_1$ or greater than the second voltage value $V_2$, and whether the other detection signal whose voltage value lies within the voltage range of the first and second voltage values $V_1$ and $V_2$ exists in any one of four division portions of the one angle division N, that is, in any one of first to fourth angle division portions H1 to H4 of the one angle division N. Accordingly, by finding out whether the other detection signal exists in any one of the first to fourth angle division portions H1 to H4 of the one angle section N, the controlling section detects the very small rotational angle of the steering wheel.

Here, for the other detection signal whose voltage value lies within the voltage range of the first and second voltage values $V_1$ and $V_2$, the first angle division portion H1 corresponds to a rising (inclined) portion 71U where the first detection signal 71 rises linearly, the second angle division portion H2 corresponds to a rising (tilted) portion 72U where the second detection signal 72 rises linearly, the third angle division portion H3 corresponds to a falling (inclined) portion 71D where the first detection signal 71 falls linearly, and the fourth angle division portion H4 corresponds to a falling (inclined) portion 72D where the second detection signal 72 falls linearly.

In the conventional rotational angle detecting device having the rotary sensor (that is, the rotation detecting section), as the rotary member (or rotor) rotates, the first to third detection signals are output from the rotation detecting section. When the controlling section detects the rotational direction and rotational angle of the rotary member based on the supplied first to third detection signals, the controlling section detects the rotational direction and the rough rotational angle of the rotary member based on the amplitude (that is, the voltage value) of the third detection signal. In addition, the controlling section detects the very small rotational angle of the rotary member based on the linearly inclined portions of the first and second detection signals. Therefore, the rotational angles and rotational direction of the rotary member can be detected with high precision over wide ranges thereof.

However, in the conventional rotational angle detecting device having the rotation detecting section, the first to third detection signals which are output from the rotation detecting section are used as they are to detect the rotational angles and rotational direction of the rotary member. Therefore, if for any reason a detection signal is erroneously output from the rotation detecting section, a rotational angle and rotational direction corresponding to the content of the erroneously output detection signal is detected. Consequently, erroneous angle detection information is supplied to the controller from the controlling section, so that the controller may not properly control the traction and the suspension of the automobile.

SUMMARY OF THE INVENTION

In view of the above-described problems, it is an object of the present invention to provide a highly reliable rotational angle detecting device which can perform a required controlling operation using a detection signal which has been determined as being a proper detection signal by a controlling section which determines whether or not various detection signals output from a rotation detecting section are proper detection signals.

To this end, according to a first aspect of the present invention, there is provided a rotational angle detecting device comprising a rotor connected to a rotary member; a rotation detecting section for outputting a sinusoidal first detection signal and a sinusoidal second detection signal as a result of the rotation of the rotor, the first detection signal and the second detection signal having constant amplitudes, having the same periods, and having wavelengths which are out of phase; a storage section for updating and storing the first detection signal and the second detection signal; and a controlling section. In the rotational angle detecting device, the controlling section compares a most recent first detection signal and a most recent second detection signal output by the rotation detecting section, and determines whether or not either one of the most recent first and second detection signals falls within a proper range with respect to the other of the most recent first and second detection signals. When the controlling section determines that either one of the first and second detection signals falls within the proper range, the controlling section supplies the most recent first and second detection signals to a controller. On the other hand, when the controlling section determines that either one of the most recent first and second detection signals falls outside the proper range with respect to the other of the most recent first and second detection signals, the controlling section does not supply the most recent first and second detection signals to the controller.

In the first structure, the first and second detection signals output from the rotation detecting section are sent to the storage section, are updated, and are stored in the storage section. The controlling section cyclically compares the most recent first and second detection signals output from the rotation detecting section in a determined period. When the controlling section determines that at least one of the most recent first and second detection signals is an unsuitable detection signal, the angle signal based on the unsuitable detection signal is not supplied to the controller. Therefore, an improper piece of detection information which is created based on the unsuitable detection signal is not supplied to the controller, thereby allowing a suitable controlling operation to be performed at all times to operate a fail safe structure by the controller. Consequently, it is possible to provide a highly reliable rotational angle detecting device.

According to a second aspect of the present invention, there is provided a rotational angle detecting device comprising a rotor connected to a rotary member; a rotation detecting section for outputting a sinusoidal first detection signal, a sinusoidal second detection signal, and a third detection signal, the first detection signal and the second detection signal having constant amplitudes, having the same periods, and having wavelengths which are out of phase, and the third detection signal increasing linearly over an entire rotational range of the rotary member; a storage section for updating and storing therein the first detection signal, the second detection signal, and the third detection signal; and a controlling section. In the rotational angle detecting device, the controlling section compares a most recent first detection signal and a most recent second detection signal output from the rotation detecting section, and determines whether or not either one of the most recent first and second detection signals falls within a proper range with respect to the other of the most recent first and second detection signals. When the controlling section determines that either one of the most recent first and second detection signals falls within the proper range, the controlling section compares a most recent third detection signal with the most recent first and second detection signals. When the controlling section determines that the signals fall within proper ranges, the controlling section supplies the most recent first to third detection signals to a controller, whereas, when the controlling section determines that the signals fall outside the proper ranges, the controlling section supplies to the controller the third detection signal previously stored in the storage section and the most recent first and second detection signals.

In the second structure, the first to third detection signals output from the rotation detecting section are sent to the storage section, are updated, and are stored in the storage section. The controlling section, first, cyclically compares the most recent first and second detection signals output from the rotation detecting section in a determined period. When the controlling section determines that both of the most recent first and second detection signals are suitable detection signals, the controlling section cyclically compares the most recent third detection signal output from the rotation detecting section with the most recent first and second detection signals in a similarly determined period. When the controlling section determines that the third detection signal is an unsuitable detection signal, it creates a proper piece of detection information using the most recent first and second detection signals and the immediately previously obtained third detection signal read out from the storage section, and the detection information is supplied to the controller. Therefore, an improper piece of detection information which is created based on any unsuitable detection signal is no longer supplied to the controller, thereby allowing a proper controlling operation to be carried out at all times to operate a fail safe structure by the controller. Consequently, using the detection information based on the first to third detection signals, it is possible to provide a rotational angle detecting device which is more reliable than the rotational angle detecting device having the first structure.

The rotary member may be a steering shaft of an automobile, and the first detection signal and the second detection signal, or the first detection signal to the third detection signal may be steering angle detection signals of the steering shaft.

By virtue of this structure, it is possible to provide a highly reliable rotational angle detecting device for generating detection signals of the steering angle of a steering shaft of an automobile.

The steering angle detection signals may be supplied to the controller through a local area network bus line provided in the automobile.

By virtue of this structure, it is possible to provide a highly reliable rotational angle detecting device for properly performing various automobile controlling operations as a result of generating detection signals of the steering angle of a steering shaft of an automobile.

DESCRIPTION OF THE PREFERRED EMBODIMENTS

Hereunder, a description of embodiments of the present invention will be given with reference to the drawings.

Figure 1:
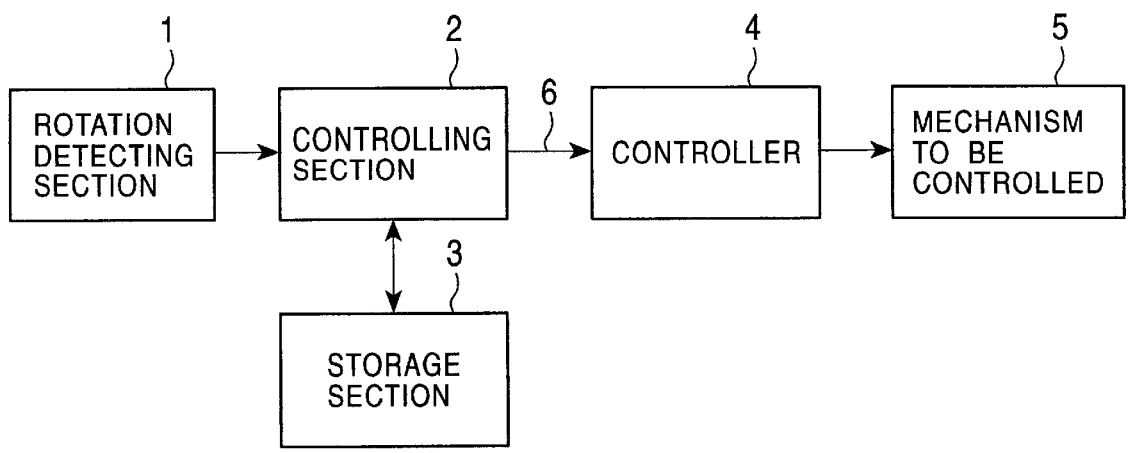
FIG. 1 is a structural view showing the main portion of an embodiment of a rotational angle detecting device in accordance with the present invention.

FIG. 1 is a structural view of the main portion of an embodiment of a rotational angle detecting device in accordance with the present invention. The rotational angle detecting device is used to detect the angle of rotation of the steering wheel of an automobile.

As shown in FIG. 1, the rotational angle detecting device of the embodiment comprises a rotation detecting section 1, a controlling section (microcomputer) 2, a storage section (memory) 3, a controller 4, a mechanism 5 to be controlled, and a bus line 6 for a local area network (LAN). A steering shaft (not shown) of an automobile is connected to the rotation detecting section 1. The mechanism 5 to be controlled comprises an automobile suspension mechanism and an automatic transmission mechanism.

Here, the rotation detecting section 1 is connected to the controlling section 2. The controlling section 2 is connected to the controller 4 through the LAN bus line 6, and to the storage section 3.

Figure 2B:
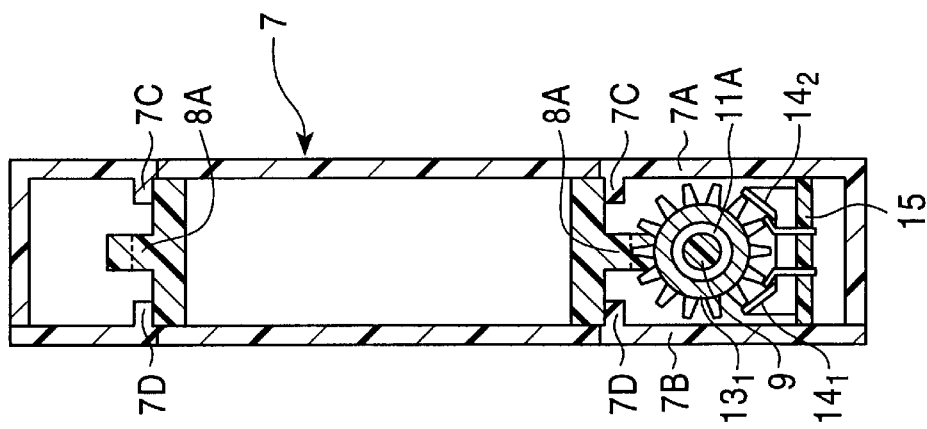
FIGS. 2A and 2B are sectional views showing in detail the structure of a rotary sensor which forms a rotation detecting section used in the present invention.
Figure 2A:
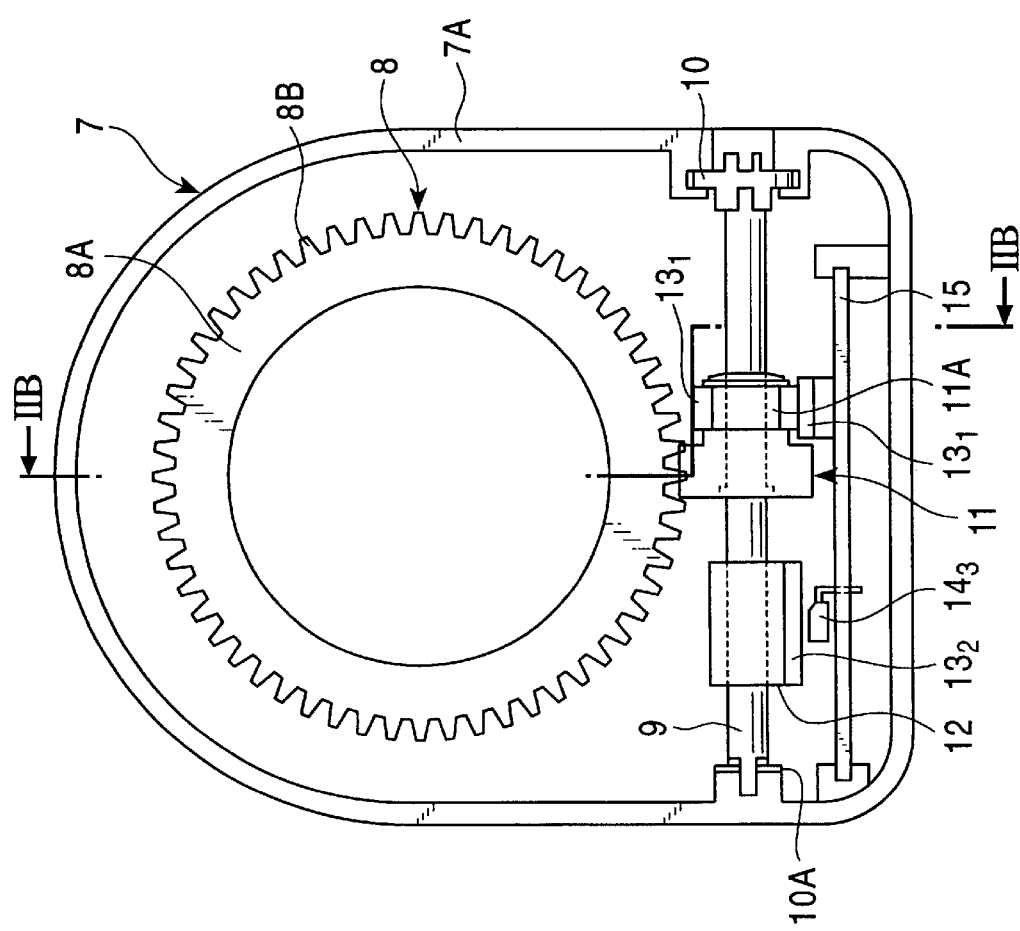

FIGS. 2A and 2B are sectional views showing in detail the structure of a rotary sensor which is the rotation detecting section 1. FIG. 2A is a horizontal sectional view, and FIG. 2B is a sectional view taken along line IIB—IIB in FIG. 2A.

As shown in FIGS. 2A and 2B, the rotary sensor comprises a housing 7, a rotor 8, a rotary shaft 9, a bearing 10, a worm gear 11, a sliding member 12, a first magnet $13_1$, a second magnet $13_2$, a first Hall element $14_1$, a second Hall element $14_2$, a third Hall element $14_3$, and a circuit board 15.

The housing 7 comprises a case 7A and a cover 7B. The housing 7 is formed by covering an opening in the case 7A with the cover 7B. One annular protrusion 7C is formed at the bottom portion of the case 7A. Similarly, one annular protrusion 7D is formed at the inside surface of the cover 7B. The rotor 8 is drum-shaped. With the steering shaft (not shown) of an automobile being inserted in the center opening of the rotor 8, the rotor 8 is secured to the steering shaft. The rotor 8 comprises a small-width protrusion 8A formed at the center of the outer periphery thereof in the widthwise direction and a worm 8B formed along the entire periphery of the protrusion 8A. When the housing 7 is being formed, both outer peripheral edges of the rotor 8 are fitted into the inner sides of the annular protrusions 7C and 7D, and, while the small-width protrusion 8A protrudes externally from between the annular protrusions 7C and 7D, the rotor 8 is rotatably stopped inside the housing 7. One end of the rotary shaft 9 is mounted to the case 7A through the bearing 10, while the other end is stopped by the case 7A through a wave-shaped washer 10A. The rotary shaft 9 has a screw groove formed along the outer periphery of a portion thereof which is fitted to the sliding member 12 (described later). The worm gear 11 is fitted to the rotary shaft 9, and engages the worm 8B. The worm gear 11 has a cylindrical magnet holding section 11A connected thereto, and the first magnet $13_1$ which is cylindrical in shape is fitted to the periphery of the magnet holding portion 11A. Here, portions of the first magnet $13_1$ opposing each other in the circumferential direction comprise the N pole and the S pole. The sliding member 12 which is cylindrical in shape has a screw groove (not shown) formed in the inner peripheral portion thereof which is fitted to the rotary shaft 9. When the sliding member 12 is fitted to the rotary shaft 9, the screw grooves of both the sliding member 12 and the rotary shaft 9 engage each other. A protruding guiding portion (not shown) which is fitted to a guide groove (not shown) of the housing 7 is formed along the outer periphery of the sliding member 12 so as to prevent rotation with the rotary shaft 9 which is rotating. In addition, the second magnet $13_2$ which is rod-shaped is formed at the sliding member 12 in an axial direction of the rotary shaft 9. Here, the opposing portions of the first magnet $13_1$ in the circumferential direction comprises a N pole and a S pole. One end of the second magnet $13_2$ is the N pole, and the other end of the second magnet $13_2$ is the S pole. The first Hall element $14_1$ and the second Hall element $14_2$ are mounted to the circuit board 15 so as to be disposed near the cylindrical first magnet $13_1$ at an angle of 90 degrees from the axial core of the rotary shaft 9. The third Hall element $14_3$ is mounted to the circuit board 15 so as to be close to the rod-shaped second magnet $13_2$. When the housing 7 is being formed, both ends of the circuit board 15 is held inside the housing 7 by a board holding section (no reference numeral).

In the above-described structure, the housing 7 and the circuit board 15 are base members, while the rotor 8, the rotary shaft 9, etc., together form a rotor structure.

Figure 3:
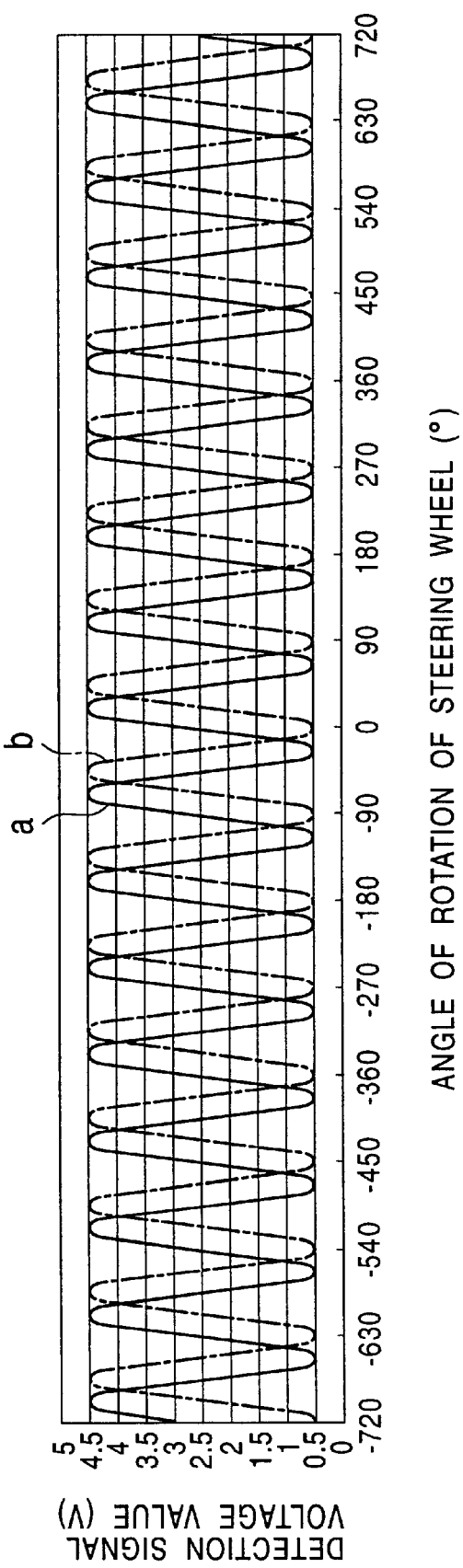
FIG. 3 is a graph showing the waveforms of first and second detection signals in the rotary sensor shown in FIG. 2 which are output when a steering wheel is rotating.
Figure 4:
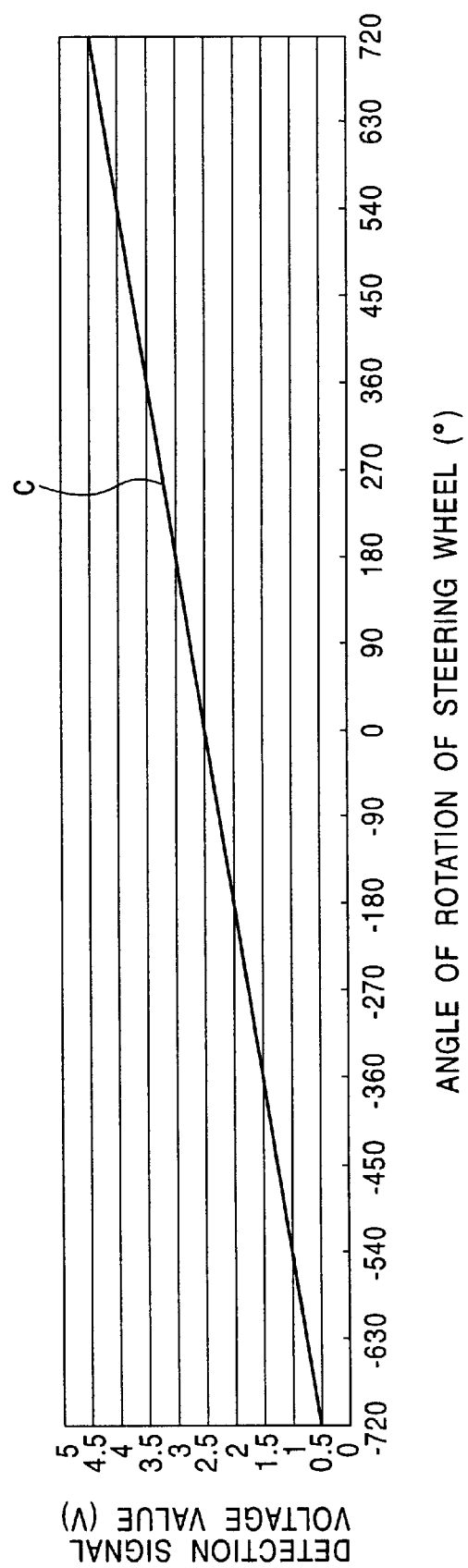
FIG. 4 is a graph showing the waveform of a third detection signal in the rotary sensor shown in FIG. 2 which is output when the steering wheel is rotating.
Figure 5:
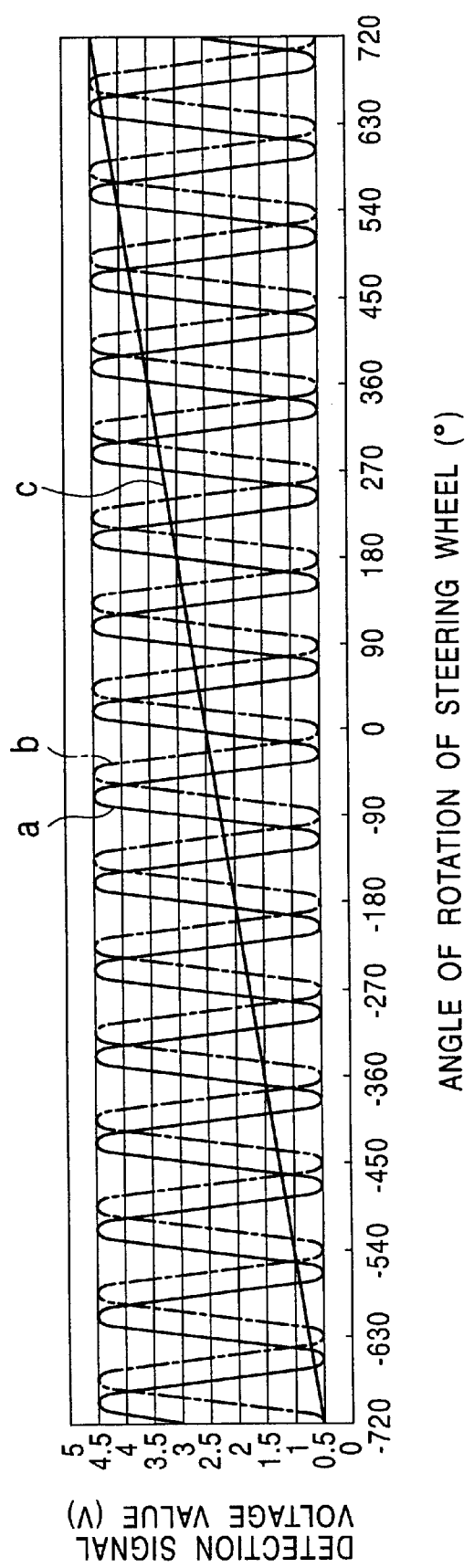
FIG. 5 is a graph showing the waveforms of the first to third detection signals in the rotary sensor shown in FIG. 2 which are output when the steering wheel is rotating.

FIGS. 3 to 5 are graphs showing the waveforms of detection signals output from the rotary sensor shown in FIGS. 2A and 2B when the steering wheel of an automobile is rotated. More specifically, FIG. 3 is a graph showing the waveforms of first and second detection signals. FIG. 4 is a graph showing the waveform of a third detection signal. FIG. 5 is a graph showing the waveforms of the first to third detection signals. In FIGS. 3 to 5, the horizontal axis represents the angle of rotation of the steering wheel, while the vertical axis represents the voltage values (that is, the amplitudes) of the detection signals.

With reference to the structural views of FIGS. 1, 2A, and 2B, and the graph of FIG. 3 showing the signal waveforms, the operation of a first embodiment of the rotational angle detecting device in accordance with the present invention used to create detection information using the first and second detection signals will be given.

In the rotation detection section 1, when the steering wheel of an automobile is rotated in order to rotate a steering shaft connected to the steering wheel, the rotor 8 having the steering shaft inserted therein is rotated. The rotation of the rotor 8 causes the worm gear 11 engaging the worm 8B of the rotor 8 and the rotary shaft 9 to which the worm gear 11 is mounted to rotate at the same time. The rotation of the worm gear 11 causes the magnet holding section 11A connected to the worm gear 11 and the first magnet $13_1$ mounted to the magnet holding section 11A to rotate at the same time. When the first magnet $13_1$ rotates, the distance between the N and S poles of the first magnet $13_1$ and the first and second Hall elements $14_1$ and $14_2$, both of which are mounted close to the first magnet $13_1$, to change periodically. As shown in FIG. 3, the first and second detection signals a and b which have the same amplitudes and periods and which are out of phase by ¼ wavelength are output from the first and second Hall elements $14_1$ and $14_2$. The first and second detection signals a and b output from the rotation detecting section 1 are supplied to the controlling section 2.

As shown in FIG. 3, in the embodiment, the first and second detection signals a and b output from the rotation detecting section 1 have peak-to-peak amplitudes voltages of 4.0 V, have periods which correspond to 90° in terms of the angle of rotation of the steering wheel, and are out of phase by ¼ wavelength, which is 22.5° in terms of the angle of rotation of the steering wheel.

From its neutral position (when its angle of rotation is 0°), the steering wheel of an automobile can usually rotate two times (which corresponds to an angle of rotation of +720°) in one direction towards the right, and two times (which corresponds to an angle of rotation of −720°) in the other direction towards the left. In the rotation detecting section 1, the angle of rotation of the steering wheel (that is, the steering shaft) is required to be in the range of ±720° from the neutral position, which is a total of 1440°. In this case, since the rotation detecting section 1 periodically obtains the aforementioned first and second detection signals a and b within the entire rotational angle range of 1440° of the steering wheel, it can usually measure all of the rotational angles of the steering wheel.

The most recent first and second detection signals a and b which have been output from the rotation detecting section 1 are supplied to the controlling section 2.

Here, based on the most recent first and second detection signals a and b which have been supplied, the controlling section 2 performs the following operations.

The controlling section 2 compares in a previously determined period the amplitudes (that is, voltage values) of the most recent first and second detection signals a and b which have been supplied in order to determine whether or not their amplitudes are within proper ranges during the comparison.

Figure 6:
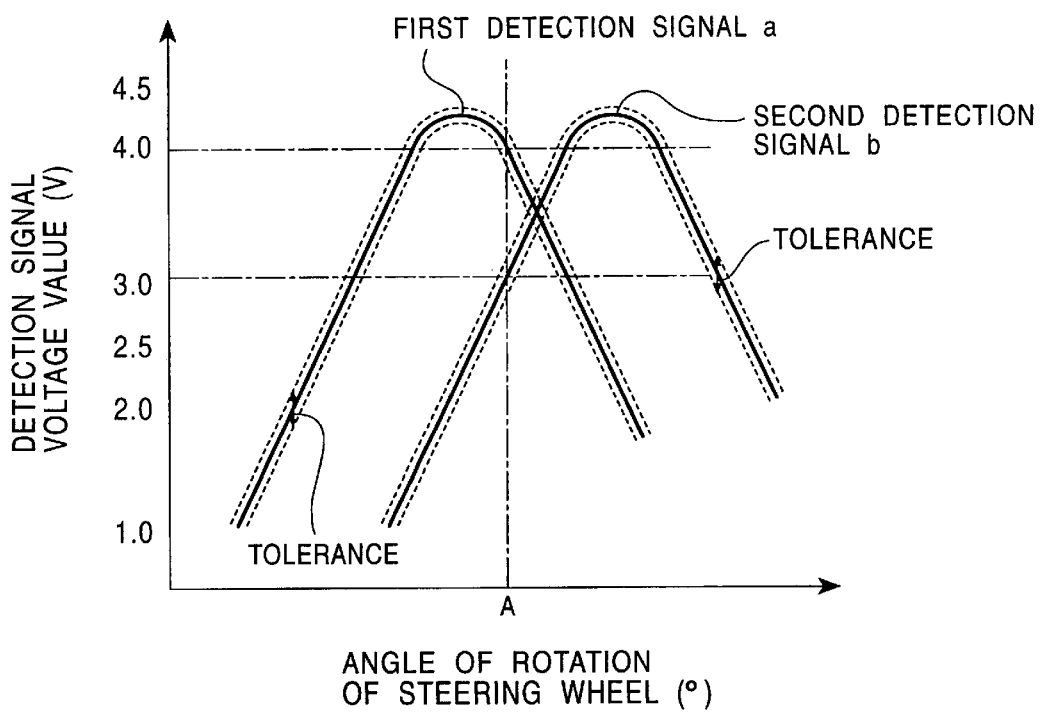
FIG. 6 is a graph showing part of the waveform amplitudes of the first and second detection signals obtained from the rotation detecting section of the rotational angle detecting device shown in FIG. 1.

FIG. 6 is a graph showing part of the waveform amplitudes of the first and second detection signals a and b obtained from the rotation detecting section 1. It is used to illustrate their states when their amplitudes are being compared.

In FIG. 6, A° represents the angle of rotation of the steering wheel representing one determination timing point when determining the amplitudes of the corresponding first and second detection signals a and b. The areas within the dotted lines which are drawn above and below the first and second detection signals a and b so as to be parallel thereto represent detection errors (tolerances) of the amplitudes of the first and second detection signals a and b. Ordinarily, these areas are set within ranges of ±0.1 V with respect to corresponding amplitude values.

Using FIG. 6 which illustrates part of the waveforms of the first and second detection signals a and b, the operations performed by the controlling section 2 when determining whether or not the amplitudes of the corresponding first and second detection signals a and b fall within their proper ranges will be described.

The controlling section 2 previously finds out the amplitude values of the first and second detection signals a and b at the determination timing point. In FIG. 6, at the determination timing point A°, the amplitude value of the first detection signal a is 4.0 V, while the amplitude value of the second detection signal 6 is 3.0 V.

Taking into consideration an error (of ±0.1 V) in the detection of the amplitude value of the first detection signal a and an error (of ±0.1 V) in the detection of the amplitude value of the second detection signal b when the amplitude value of the first detection signal a and the amplitude value of the second detection signal b at the determination timing point A° are obtained, the controlling section 2 determines that the amplitude values of the corresponding first and second detection signals a and b are within the proper ranges when the amplitude value of the second detection signal b falls within a range of 3.0±0.2 V and the amplitude value of the first detection signal falls within a range of 4.0±0.2 V in the case where the amplitude value of the first detection signal a is 4.0 V and the amplitude value of the second detection signal b is 3.0 V.

When the controlling section 2 determines that the amplitude values of the corresponding first and second detection signals a and b fall within their proper ranges, it sends the most recent first and second detection signals and b to the storage section 3. The most recent first and second detection signals a and b are written over the first and second detection signals a and b which have been previously stored in the storage section 3 in order to update the storage content of the storage section to the most recent first and second detection signals a and b.

Thereafter, using the most recent first and second detection signals a and b, the controlling section 2 detects the direction and angle of rotation of the steering wheel, and creates detection information of the detected rotational direction and the angle of rotation of the steering wheel from its neutral position. The created detection information is supplied to the controller 4 through the LAN bus line 6. Based on the supplied detection information, the controller 4 carefully executes a controlling operation on the mechanism 5 to be controlled, such as the automatic transmission and the suspension of the automobile.

Referring to FIGS. 1, and 2A and 2B which are structural views, and FIGS. 3 to 5 which illustrate the signal waveforms, a description of the operation of a second embodiment of a rotational angle detecting device in accordance with the present invention which creates detection information using a third detection signal c in addition to the first and second detection signals a and b will be given.

As in the operation of the first embodiment, when the steering wheel of an automobile rotates, causing a steering shaft connected to the steering wheel to rotate, first and second detection signals a and b having the same amplitudes and periods and being out of phase by ¼ wavelength are output from a first Hall element $14_1$ and a second Hall element $14_2$ in a rotation detecting section 1, as shown in FIG. 3. At the same time, when a rotary shaft 9 rotates, a sliding member 12 whose screw gear engages the rotary shaft 9 slides in the axial direction of the rotary shaft 9, causing a second magnet $13_2$ mounted to the sliding member 12 to also slide in the axial direction of the rotary shaft 9. When the second magnet $13_2$ slides, the distance between the N and S poles of the second magnet $13_2$ and a third Hall element $14_3$ changes, so that the third detection signal c which increases (or decreases) linearly as the angle of rotation of the steering wheel changes in one period is output from the third Hall element $14_3$ as shown in FIG. 4. The first to third detection signals a to c output from the rotation detecting section 1 are supplied to a controlling section 2.

In the second embodiment, as shown in FIGS. 3 to 5, the first and section detection signals a and b output from the rotation detecting section 1 have peak-to-peak amplitude voltages of 4.0 V, have periods corresponding to 90° in terms of the angle of rotation of the steering wheel, and are out of phase by ¼ wavelength, which is 22.5° in terms of the angle of rotation of the steering wheel. Similarly, as shown in FIGS. 4 and 5, the third detection signal c output from the rotation detecting section 1 has a minimum amplitude of 0.5 V and a maximum amplitude of 4.5 V, and a period corresponding to 1440° in terms of the angle of rotation of the steering wheel. Here, since, as mentioned previously, the rotation detecting section 1 previously obtains the first to third detection signals a to c within the entire rotational angle range of 1440° of the steering wheel, the rotation detecting section 1 is ordinarily capable of detecting all rotational angles of the steering wheel.

The most recent first to third detection signals a to c output from the rotation detecting section 1 are supplied to the controlling section 2. Based on the most recent first to third detection signals a to c which have been supplied, the controlling section 2 performs the following operations.

As in the first embodiment, the controlling section 2 compares in a previously determined period the amplitudes (that is, the voltage values) of the most recent first and second detection signals a and b which have been supplied in order to determine whether or not the amplitude values of the first and second detection signals a and b fall within their proper ranges. More specifically, the controlling section 2 determines that the amplitude values of the first and second detection signals a and b fall within their proper ranges when the amplitude value of the second detection signal b falls within the range of 3.0±0.2 V and the amplitude value of the first detection signal a falls within the range of 4.0±0.2 V in the case where the amplitude value of the first detection signal a is 4.0 V and the amplitude value of the second detection signal b is 3.0 V. Otherwise, the controlling section 2 determines that the amplitude values of the corresponding first and second detection signals a and b do not fall within their proper ranges.

Here again, when the controlling section 2 determines that the amplitude values of the corresponding first and second detection signals fall within their proper ranges, it sends the most recent first and second detection signals a and b which have been supplied to a storage section 3. The most recent first and second detection signals a and b are written over the first and second detection signals a and b which have been previously stored in the storage section 3 in order to update the storage content of the storage section 3 to the most recent first and second detection signals a and b.

Then, the controlling section 2 compares the amplitude values of the corresponding most recent first and second detection signals a and b with the amplitude value of the most recent third detection signal c in order to determine whether or not they fall within their proper ranges.

Here, as shown in FIG. 4, the amplitude value of the most recent third detection signal c which is compared to the amplitude values of the corresponding most recent first and second detection signals a and b varies with the rotational angle location of the steering wheel. Therefore, in the second embodiment illustrated in FIGS. 3 to 5, when the angle of rotation of the steering wheel is 0° (which corresponds to its neutral position), the amplitude value is 2.5 V. When the angle of rotation of the steering wheel is equal to either one of the extreme values of the rotational angle range, the amplitude value is a minimum at 0.5 V or is a maximum at 4.5 V. When the angle of rotation of the steering wheel is between these extreme values, the amplitude value varies linearly between 0.5 V and 4.5 V.

When the controlling section 2 compares the amplitude values of the corresponding first and second detection signals a and b with the amplitude value of the most recent third detection signal c, and determines that these amplitude values fall within their proper ranges, it sends the most recent third detection signal c which has been supplied to the storage section 3. The most recent third detection signal c is written over the third detection signal c which has been previously stored in the storage section 3 in order to update the storage content of the storage section 3 to the most recent third detection signal c in addition to updating the storage content of the storage section 3 to the most recent first and second detection signals a and b.

Thereafter, using each of the most recent first to third detection signals a to c, the controlling section 2 is detects the direction and angle of rotation of the steering wheel, and creates detection information of the detected direction of rotation and the angle of rotation of the steering wheel from the neutral position. The created detection information is supplied to a controller 4 through a LAN bus line 6.

On the other hand, when the controlling section 2 compares the amplitude values of the first and second detection signals a and b with the amplitude value of the third detection signal c, and determines that the amplitude values thereof do not fall within their proper ranges, the most recent third detection signal c is destroyed so that it is not sent to the storage section 3. At the same time, the immediately previously stored third detection signal c is read out from the storage section 3.

In the second embodiment, the period (that is, the sampling period) of the output of the third detection signal c from the rotation detecting section 1 is 200 $\mu$sec, and the period (that is, the transmission period) of the output of the detection information from the controlling section 2 is 5±0.5 msec (10±1 msec). Since it is necessary to use the immediately previously stored third detection signal c when the amplitude value of the most recent third detection signal c does not fall within its proper range, the sampling period and the transmission period are set asynchronously. In order to increase precision, the controlling section 2 sets a high order of priority for an interruption in the sampling period than in the transmission period. When the setting is such, the transmission period may vary, but the controlling section 2 is designed so that most of the variations fall within the target range of 5 msec.

Thereafter, using the most recent first and second detection signals a and b and the third detection signal c read out from the storage section 3, the controlling section 2 detects the direction of rotation and angle of rotation of the steering wheel, and creates detection information of the detected direction of rotation of the steering wheel and angle of rotation of the steering wheel from its neutral position. The created detection information is supplied to the controller 4 through the LAN bus line 6.

Based on the supplied detection information, the controller 4 carefully controls a mechanism 5 to be controlled, such as the automatic transmission and the suspension of the automobile.

Figure 7:
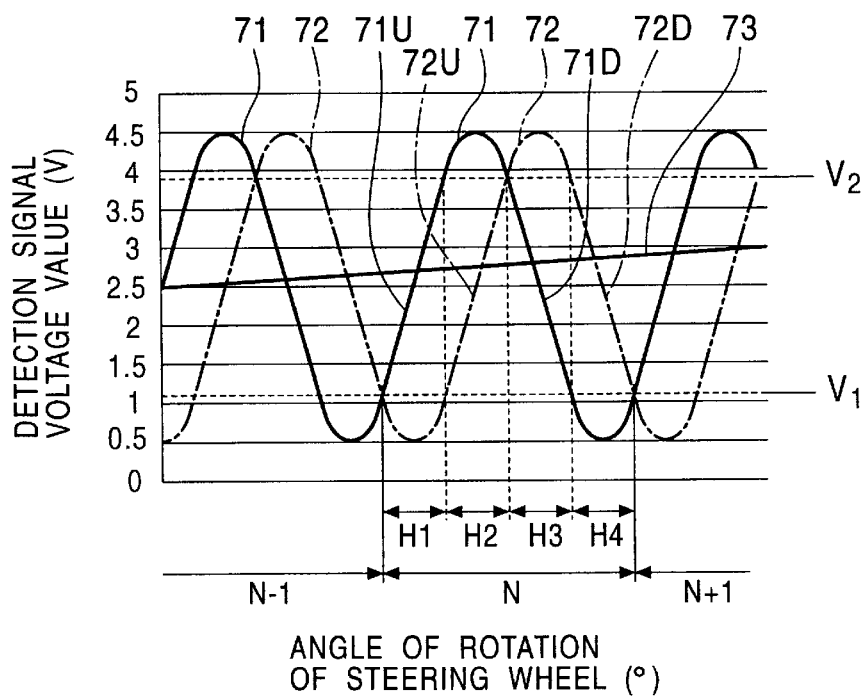
FIG. 7 shows the relationship between the angle of rotation of the steering wheel and the output voltages of the first to third detection signals.

In the second embodiment, the detection operations of the rough rotational angle and rotational direction of the steering wheel carried out at the controlling section 2 using the third detection signal c are the same as the detection operations of the rough rotational angle and rotational direction of the steering wheel by the previously described, rotation-side sensor as shown in the graph of FIG. 7. In addition, the detection operation of the very small rotational angle using the first and second detection signals a and b carried out at the controlling section 2 is the same as the detection operation of the very small rotational angle of the steering wheel by the previously described, rotation-side sensor as shown in the graph of FIG. 7. Therefore, the detection operations of the rotational direction, the rough rotational angle, and the very small rotational angle in the second embodiment will not be described any further.

Even in the second embodiment, when the controlling section 2 determines that the amplitude values of the most recent first and/or second detection signals a and b do not fall within their proper ranges, the controlling section 2 determines that either one or both of the most recent first and second detection signals a and b which have been supplied is or are an unsuitable detection signal or unsuitable detection signals, and gets rid of the most recent first and/or second detection signals a and b so that they are not sent to the storage section 3. When the most recent first and second detection signals a and b are destroyed, the controlling section 2 does not transmit the most recent third detection signal c which is compared therewith to the storage section 3 and gets rid of it.

At this point of time, the controlling section 2 does not create detection information so that no detection information is supplied to the controller 4 through the LAN bus line 6. Therefore, the mechanism 5 to be controlled is not controlled by the controller 4.

As can be understood from the foregoing description, in the first aspect of the invention, the first and second detection signals output from the rotation detecting section are transmitted to the storage section, are updated, and stored in the storage section. The controlling section cyclically compares the most recent first and second detection signals output from the rotation detecting section at the determined period. When it determines that at least one of the most recent first and second detection signals is not a proper detection signal, an angle signal based on the most recent first detection signal and second detection signal is not supplied to the controller. Therefore, an improper piece of detection information which is created based on the improper detection signal is not supplied to the controller, so that, at all times, the controller can properly perform a controlling operation to operate a fail-safe structure, making it possible to obtain a highly reliable rotational angle detecting device.

According to the second aspect of the invention, the first to third detection signals output from the rotation detecting section are transmitted to the storage section, are updated, and stored in the storage section. The controlling section first cyclically compares the most recent first and second detection signals output from the rotation detecting section at the determined period. When the controlling section determines that both of the most recent first and second detection signals are proper detection signals, it cyclically compares the most recent third detection signal output from the rotation detecting section with the most recent first and second detection signals in a similarly determined period. When the controlling section determines that the third detection signal is an improper detection signal, it creates a proper piece of detection information using the most recent first and second detection signals and the third detection signal immediately previously read out from the storage section. Since this detection information is supplied to the controller, an improper piece of detection information which is created based on any improper detection signal is not supplied to the controller. Therefore, the controller can at all times perform a proper controlling operation to operate a fail-safe mechanism. Using the detection information based on the first to third detection signals, it is possible to obtain a rotational angle detecting device which is more reliable than the rotational angle detecting device of the first aspect of the invention.

What is claimed is:

1. A rotational angle detecting device, comprising:

a rotor connected to a rotary member;

a rotation detecting section for outputting a sinusoidal first detection signal and a sinusoidal second detection signal as a result of the rotation of the rotor, the first detection signal and the second detection signal having constant amplitudes, having the same periods, and having wavelengths which are out of phase with each other;

a storage section for storing a most recently detected first detection signal and a most recently detected second detection signal;

a controller; and a controlling section for receiving the first detection signal and the second detection signal from the rotation detecting section, for comparing the first detection signal and the second detection signal with the most recently detected first detection signal and the most recently detected second detection signal in the storage section, for updating the most recently detected first detection signal and the most recently detected second detection signal in the storage section, and for supplying the first detection signal and the second detection signal to the controller;

wherein the controlling section compares the first detection signal and the second detection signal received from the rotation detecting section with the most recently received first detection signal and the most recently received second detection signal stored in the storage section, respectively, and determines whether the first and second detection signals fall within a proper range with respect to the most recently received first and second detection signals, and if so, then the controlling section supplies the first and second detection signals to the controller and updates the most recently received first and second detection signals in the storage section with the first and second detection signals, whereas, if the controlling section determines that the first and second detection signals fall outside the proper range with respect to the most recently received first and second detection signals, then the controlling section does not supply the first and second detection signals to the controller.

2. A rotational angle detecting device according to claim 1, wherein the rotary member is a steering shaft of an automobile, and wherein the first detection signal and the second detection signal are steering angle detection signals of the steering shaft.

3. A rotational angle detecting device according to claim 2, wherein the steering angle detection signals are supplied to the controller through a local area network bus line provided in the automobile.

4. A rotational angle detecting device according to claim 1, wherein the proper range is defined as the most recently received first detection signal and the most recently received second detections signal ±0.2 V, respectively.

* * * * *